(12) United States Patent
Tridico

(10) Patent No.: US 10,198,588 B2
(45) Date of Patent: Feb. 5, 2019

(54) ASYMMETRIC MULTI-APPARATUS ELECTRONIC INFORMATION STORAGE AND RETRIEVAL

(71) Applicant: Christopher Ralph Tridico, Granite Falls, NC (US)

(72) Inventor: Christopher Ralph Tridico, Granite Falls, NC (US)

(*) Notice: Subject to any disclaimer, the term of this patent is extended or adjusted under 35 U.S.C. 154(b) by 435 days.

(21) Appl. No.: 14/729,148

(22) Filed: Jun. 3, 2015

(65) Prior Publication Data

US 2015/0347780 A1 Dec. 3, 2015

Related U.S. Application Data

(60) Provisional application No. 62/006,945, filed on Jun. 3, 2014.

(51) Int. Cl.
*G06F 21/00* (2013.01)
*G06F 21/62* (2013.01)
(Continued)

(52) U.S. Cl.
CPC .......... *G06F 21/6218* (2013.01); *G06F 21/64* (2013.01); *H04L 63/0428* (2013.01); *H04L 67/1097* (2013.01)

(58) Field of Classification Search
CPC . G06F 21/6218; G06F 21/64; H04L 63/0428; H04L 67/1097
See application file for complete search history.

(56) References Cited

U.S. PATENT DOCUMENTS 7,734,643 B1 * 6/2010 Waterhouse ...... G06F 17/30067
707/770
8,462,665 B2 6/2013 Tabbara et al.
(Continued)

OTHER PUBLICATIONS

Schnjakin, Maxim et al., "Evaluation of Cloud-RAID: A Secure and Reliable Storage above the Clouds," 2013 22nd International Conference on Computer Communication and Networks (ICCCN), Nassau, 2013, pp. 1-9.
(Continued)

*Primary Examiner* — Mahfuzur Rahman
*Assistant Examiner* — Narciso Victoria
(74) *Attorney, Agent, or Firm* — Coats & Bennett, PLLC

(57) ABSTRACT

The present invention provides a system and automated methods to enable a collection of electronic information to be divided into multiple asymmetric scrambled subsets, stored across a plurality of disparate apparatuses, and reconstructed as needed. The present invention provides automated methods to adjust the relative size of the scrambled subsets based upon characteristics such as performance, cost and available space of the apparatuses on which the subsets are stored. The present invention enables the scrambled subsets of electronic information to be created, accessed and manipulated as though they are located on a local device in an integrated and unscrambled state. The present invention enables fault tolerance and enhanced performance through optional redundancy and parity capabilities. The present invention generates an electronic blueprint used to deconstruct the original collection of electronic information and reconstruct it as needed. This electronic blueprint may be encrypted, transferred and shared as required.

20 Claims, 1 Drawing Sheet

Embodiment 1 - High Level Architecture Block Diagram

(51) Int. Cl.
*G06F 21/64* (2013.01)
*H04L 29/08* (2006.01)
*H04L 29/06* (2006.01)

(56) References Cited

U.S. PATENT DOCUMENTS

| | | | |
|---|---|---|---|
| 9,558,206 B2* | 1/2017 | Molaro | G06F 11/1076 |
| 2007/0033430 A1* | 2/2007 | Itkis | G06F 3/0607 |
| | | | 714/6.12 |
| 2008/0126357 A1* | 5/2008 | Casanova | G06F 17/30215 |
| 2011/0029524 A1* | 2/2011 | Baptist | G06F 11/1076 |
| | | | 707/737 |
| 2013/0073702 A1* | 3/2013 | Umbehocker | G06F 9/5016 |
| | | | 709/222 |
| 2015/0039831 A1* | 2/2015 | Auvenshine | G06F 3/0643 |
| | | | 711/118 |
| 2015/0193309 A1* | 7/2015 | Khadiwala | G06F 11/1435 |
| | | | 714/4.11 |

OTHER PUBLICATIONS

"Evaluation of Cloud-RAID: A Secure and Reliable Storage Above the Clouds"; Maxim Schnjakin, Christoph Meinel;Hasso Plattner Institute;Potsdam University, Germany.

* cited by examiner

Embodiment 1 - High Level Architecture Block Diagram
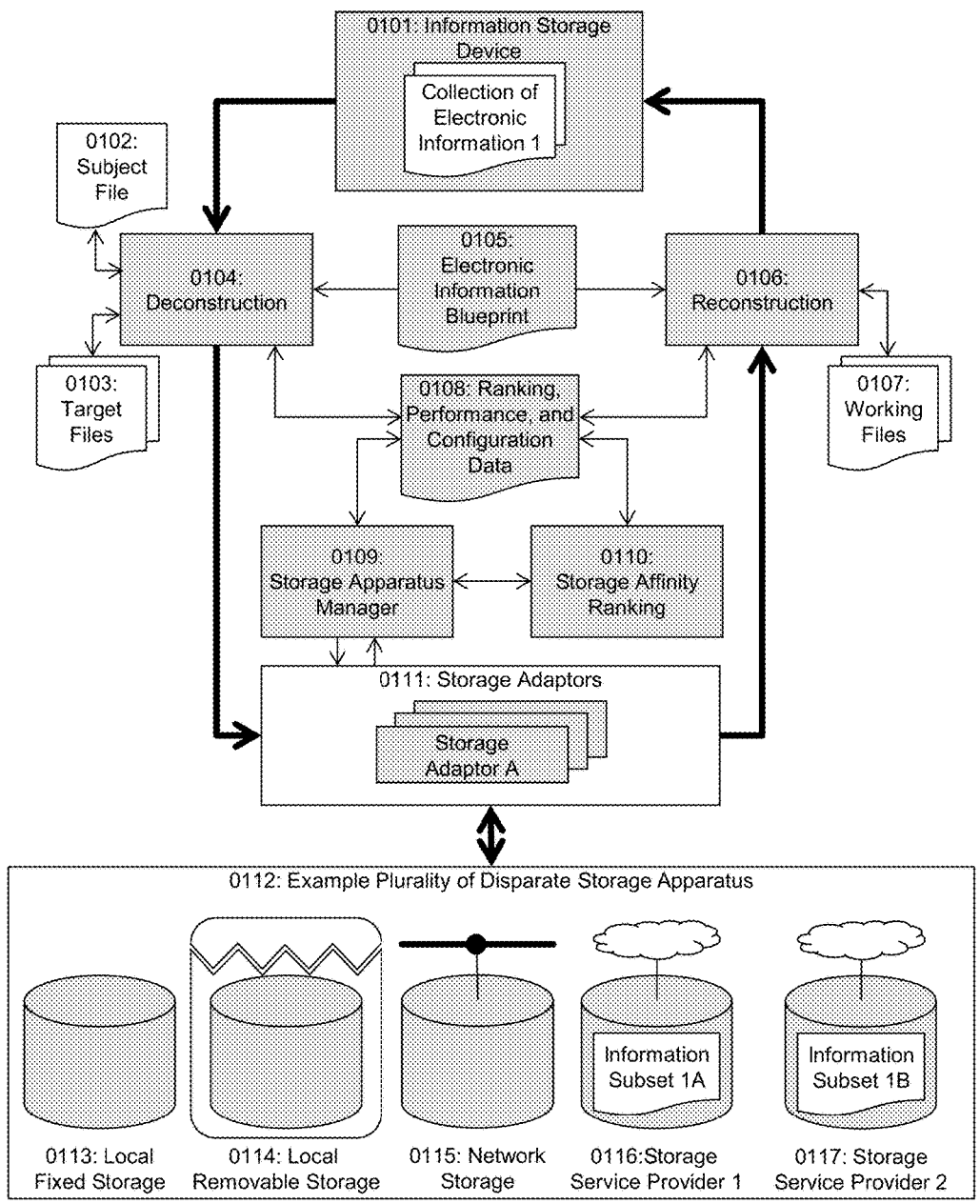

ASYMMETRIC MULTI-APPARATUS ELECTRONIC INFORMATION STORAGE AND RETRIEVAL

CROSS-REFERENCE TO RELATED APPLICATIONS

This application is a continuation of U.S. provisional patent application No. 62/006,945 filed Jun. 3, 2014.

STATEMENT REGARDING FEDERALLY SPONSORED RESEARCH OR DEVELOPMENT

Not Applicable

REFERENCE TO SEQUENCE LISTING

Not Applicable

BACKGROUND OF THE INVENTION

Field of the Invention

The present invention relates to the field of electronic information storage and retrieval.

Background of the Invention

Electronic information is created, stored and accessed by users, organizations and other entities on a wide range of electronic devices. This information is often sensitive in nature with financial data, private images or recordings, personal correspondence, copyrighted material, legal documents, sensitive data bases, and proprietary designs as just a few examples. In many cases it is desirable to move, copy or backup this electronic information in order to provide redundancy, release storage space on a given device, facilitate access on other devices or to selectively share the information. Various combinations of methods, devices and systems are used for these purposes including the following prior art examples:

Local Persistent Storage wherein copies of the electronic information are placed on storage co-located with and directly connected to the device upon which the electronic information currently resides. An example of this might be a secondary local fixed storage drive, a removable storage drive or a nearby directly connected drive.

Remote Storage such as Network Attached Storage ("NAS"), Storage Area Networks ("SAN") or Storage Service Provider ("SSP") storage solutions wherein storage is physically removed from the accessing device and is connected through a dedicated connection or through a virtual connection on a private or public network. Examples of this include a NAS device on the same local area network, multiple storage devices accessed over a virtual private network or a SSP solution that may be geographically distant with an unspecified location accessed over a public network.

Redundant Arrays of Inexpensive/Independent Disks/Devices ("RAID") wherein interrelated electronic information is distributed across multiple physical or logical storage devices in a systematic fashion in order to provide some combination of fault tolerance, improved performance, increase capacity or other desirable characteristics. RAID concepts are implemented in hardware, software or a combination of the two and are applied to local storage devices, remote storage or a combination thereof. Prior art extends to the implementation of RAID concepts across multiple SSPs.

Shared Communal Storage wherein interrelated electronic information is stored across a dynamic group of physical or logical devices registered with a storage community in order to share storage space. A Shared Communal Storage implementation may provide the benefits of a RAID implementation such as fault tolerance and improved performance and may leverage many RAID like concepts.

Tiered Storage wherein electronic information is stored across storage solutions with different characteristics such as performance, reliability, capacity and geographic location. Specific electronic information is selectively stored across these storage solutions based on the nature of the information; e.g., some information may be accessed or updated often, some information may be required to physically reside in a certain country due to information sovereignty requirements and some information may require a significant amount of storage space.

Electronic Information Encryption wherein stored electronic information is converted into a cypher in order to impede unauthorized access. This conversion may occur on the originating device, during transmission or during the storage process and may be accomplished via software, hardware or a combination of the two.

In practice the above prior art is often used in combination. For example, a SSP may provide remote storage that is physically housed on a RAID storage solution and is accessed through software that facilitates encryption of electronic information prior to its transmission across a public network to the SSP's facilities.

Various implementations of the above prior art have facilitated the backup, storage and sharing of information globally across a wide range of devices and have delivered tremendous value and utility to individuals and organizations. With the availability of inexpensive network and internet connected storage devices and low cost SSP offerings, individuals and organizations that might not be able to afford or manage a globally accessible storage solution have relatively simple and cost effective options.

Technical Problem

While prior art and existing implementations thereof provide tremendous capabilities, there remain significant shortcomings and gaps in capabilities including the following:

Information is transmitted and stored in contiguous blocks or in regular and predictable patterns, and in some cases it may be stored without being encrypted. This enables SSPs, hosting solution providers, and other parties to access the stored information. In the event of a malicious breach of an electronic information storage solution the exposure of information can be a nuisance at best and may be extremely costly and harmful depending on the information. Even in cases where the transmitted and stored information is encrypted, a malicious party that is able to obtain a complete copy of interrelated information may, with sufficient resources, decrypt the information.

In cases where multiple electronic information storage solutions are available, users must manage which information is stored on which solution. In many cases it is preferable to aggregate storage and provide a single integrated storage solution to the user. For example, if each user in a ten person organization has individual 10 GB storage accounts with various SSPs, it may be advantageous to be able to utilize the accounts as a single 100 GB storage solution. In another example, an individual may have accounts with two different storage service providers, one with 10 GB of available capacity and one with 15 GB of available capacity. It may be preferable for the individual to be able to use them as a single 25 GB account.

In the case where one or more independent data storage solutions are utilized, if one of the solutions is unavailable or is performing poorly it is advantageous to be able to leverage the remaining data storage solutions to compensate for the unavailable or poor performing solution.

In an environment in which storage costs change rapidly, it is desirable to dynamically adjust the relative amount of information that is stored in each of the available storage solutions.

BRIEF SUMMARY OF THE INVENTION

The present invention provides a system and automated methods to enable a collection of electronic information to be divided into multiple asymmetric scrambled subsets, stored across a plurality of disparate apparatuses, and reconstructed as needed. These apparatuses may be electronic memory, local fixed electronic information storage devices, portable electronic information storage devices, Network Attached Storage, remote Storage Service Providers or any other electronic information storage solution. The present invention is composed of a variable electronic blueprint and automated methods implemented in software, hardware or a combination thereof to deconstruct electronic information and communicate with one or more electronic information storage solutions to then store the deconstructed subsets. The present invention also provides reciprocal automated methods implemented in software, hardware or a combination thereof to reconstruct a copy of the original electronic information from the deconstructed and stored subsets. A compatible blueprint and comprehensive collection of information subsets must be available in order to reconstruct the original collection of electronic information.

BRIEF DESCRIPTION OF THE DRAWINGS

FIG. 1: Embodiment 1—High Level Architecture Block Diagram. Provides an overview block diagram of the primary components of the present invention and the interactions between them. This diagram is constructed with a focus on the description of Embodiment 1 in order to aid in its explanation.

DETAILED DESCRIPTION OF THE INVENTION

Advantageous Effects of Invention

The present invention enhances the security of electronic information and impedes unauthorized access to electronic information. This is the case even if the information is transmitted and stored without the use of traditional encryption. In order to access the information deconstructed by the present invention, an organization, individual or other entity will require a copy of the blueprint and a copy of all of the stored subsets of the collection of electronic information. As the subsets are irregular in composition, reconstruction from an incomplete collection of the information subsets or reverse engineering by means of frequency analysis becomes more difficult. Even in the event that one storage solution for the information is compromised, the compromised subset by itself is meaningless without the other subsets and the corresponding blueprint.

The present invention enables electronic information to span disparate storage solutions. As the present invention enables integrated collections of electronic information to be stored in smaller subsets and then reintegrated through automated means when required, these smaller subsets may be distributed across multiple accounts, platforms, devices or storage platforms as required. This eases management and increases the utility of storage options that may be of little value on their own.

The present invention enhances performance by enabling electronic information to be spread across multiple platforms with automated means to store a larger subset of the information on higher performance storage solutions.

The present invention provides fault tolerance. The present invention includes automated methods to generate redundant copies of deconstructed data subsets or parity information that is maintained across storage solutions. Full redundancy may be provided with only a 50% additional storage space requirement and may utilize lower performance and thus lower cost storage solutions.

The present invention facilitates cost effective regulatory data compliance. As many jurisdictions place regulatory constraints on where certain types of electronic information may be stored, the present invention's ability to direct what is by itself a meaningless subset of information to a particular storage solution while maintaining the balance of the information and the blueprint required for reconstruction in a geographically compliant storage solution may provide additional storage options that maintain compliance.

The present invention provides automated methods to allocate electronic information to storage solutions based on cost, capacity, locations, availability, performance or any combination thereof. In addition, the present invention provides automated methods to dynamically reallocate both future and existing electronic information as the cost, capacity and performance of available storage solutions change.

DESCRIPTION OF EMBODIMENTS

Embodiment 1

Personal Computer Information Back-up Across Two Storage Service Provider Accounts and Accessed from a Mobile Phone This first exemplary embodiment of the present invention consists of:

Automated methods in the form of software running on a personal computer

Automated methods in the form of software running on a mobile smartphone

Accounts with two disparate Storage Service Providers

The PC software of this embodiment is configured to monitor the contents of multiple directories on a single solid state electronic information storage drive ("SSD") on a personal computer ("PC") (FIG. 1-0101: Information Storage Device). When a file in one of the monitored directories is added or altered, a copy of said file (the "subject file") is made in a separate working directory on the SSD (FIG. 1-0102: Subject File).

This embodiment of the present invention includes Storage Adaptors (FIG. 1-0111) and a Storage Apparatus Manager (FIG. 1-0109) to interface with varied storage technologies including creating and maintaining connections, managing the upload and retrieval of subsets of electronic information and collecting information on the capabilities, state and performance of the various storage apparatuses (FIG. 1-0112: Example Plurality of Disparate Storage Apparatuses). The software of this embodiment of the present invention interacts with accounts on two separate SSPs (FIGS. 1-0116 and 0117). Information on the available storage capacity and performance on the relevant accounts of the two SSPs is collected by the Storage Affinity Ranking ("SAR") engine (FIG. 1-0110). The SAR engine compares the available capacity and performance and calculates a storage affinity ratio indicating the relative size of any information subsets that are to be stored on the two SSP accounts. For the sake of this example embodiment, the performance and capacity of the two SSP accounts are similar resulting in a storage affinity ratio of 1 to 1 for these accounts. This directs this embodiment of the present invention to store the same amount of information on each of the two SSPs.

A 256 Byte random binary Electronic Information Blueprint ("blueprint") is stored on the PC in this embodiment (FIG. 1-0105: Electronic Information Blueprint).

File metadata such as name, relative location, access rights and dates are appended to the subject file. A binary representation of the appended subject file size in bits is combined with a subset of the blueprint through a logical bitwise AND operation to determine the deconstruction starting point, i.e., the position in the subject file where processing will begin.

Two target files are then created to receive the scrambled information from the deconstructed subject file (FIG. 1-0103: Target Files). The two target files are given unique file names with a shared base so that they may be easily related to each other. The next byte of information in the blueprint is then used to determine how many bits will be copied from the subject file to the first target file and if these bits are to come from the portion of the subject file above or below the identified starting point. A stored value is used in order to track the offset before the starting point in the subject file where processing is occurring and another stored value contains the offset after the starting point where processing is occurring. A subsequent byte from the blueprint is then used to determine how many bits will be copied from the subject file to the second target file and if those bits are to come from the portion of the subject file using the offset before or the offset after the starting point. This process is repeated and if an offset value indicates a file position before the beginning of the subject file or after the end, the offset value "wraps" to the other end of the subject file and processing continues. If all bytes of the blueprint have been utilized, use of the blueprint is simply restarted from the first byte. When an offset value indicates a position in the subject file that will equal or exceed the position indicated by the other offset value, the amount of overlap is appended to both target files along with a numerical value that indicates the relative size of the files, which target file was last written to and an indicator of the last position in the blueprint that was used for processing.

In this embodiment of the present invention, the target files are each stored separately in the pre-established accounts on the two SSPs (FIG. 1-0116, 1-0117). Upon successful storage of the target files, local copies of the target files are deleted and the source file metadata is stored on the PC along with the metadata of the target files.

The mobile phone software of this embodiment of the present invention is connected to and periodically polling the pre-established accounts of the two SSPs by means of the storage adaptors (FIG. 1-0111). When the mobile phone software detects the newly created target files, they are downloaded to the mobile phone and stored in non-volatile memory using the SSP adaptors of this embodiment. These deconstructed files are then recombined into the original subject file or "reconstructed file" for use on the mobile phone.

This reconstruction process is accomplished initially by extracting and removing the overlap, relative size, last target file written to and last blueprint position information from the deconstructed files. The mobile phone software has a stored local copy of the blueprint used in creating the deconstructed files and this is used in conjunction with the combined length of the deconstructed files to calculate the length of the reconstructed file and the position in the reconstructed file where deconstruction processing originated (this is through the same bitwise AND method that was used previously to determine the position in the subject file where deconstruction began). Two working files (FIG. 1-0107) are then created, one for the portion of the subject file before the deconstruction start point and one for the portion after it. Processing then commences from the end of the last deconstructed file written to and the blueprint and overlap information are used to determine how many bits from the end of that file are to be copied and if they are to be placed in the "before" working file or the "after" working file. The blueprint is then used in reverse order to determine how many bits are to be copied from each deconstructed file in turn and which working file they are to be copied to. After the deconstructed files are fully processed the before working file is inverted and the after working file inverted and appended to the before working file. File metadata is then extracted and removed from the end of the before working file and used to rename the before working file and set its attributes. The resulting reconstructed file is identical to the original subject file.

Variations

Embodiments of the present invention may include facilities to indicate that a specific collection of electronic information is in use and prevent other instances of the specific collection from being accessed or modified while this is the case. Alternatively, the present invention may allow creation of a new copy of the in-use information. Metadata to facilitate the locking and version control of information may be embedded in stored data, appended to file names, or stored in separate metadata structures.

The Electronic Information Blueprints of the present invention may take a wide range of forms varying in length, encoding and storage approach. They may be randomly generated, manually created and maintained, derived from seed data through a hash algorithm or similar technique or be created through some combination of these approaches. Electronic Information Blueprints may be generated independently on each device where they are needed through the use of common algorithms and seed data, may be stored and shared in an encrypted fashion, may be physically transferred or may be manually entered on each device where they are utilized. One example embodiment of the present invention would generate a blueprint by hashing a user entered phrase utilizing a variant of Secure Hash Algorithm.

In cases where there is a difference in the performance, available space, cost or other characteristic, an embodiment of the present invention may use a ratio or other multiplier to consistently scale the amount of information to be written to one or more storage solutions.

The present invention may store deconstructed information subsets across any number of any type of electronic information storage devices.

An embodiment of the present invention may incorporate checkpoint/restart logic to enable information deconstruction, reconstruction, storage and retrieval to be interrupted and restarted without having to begin the process anew.

The present invention may be applied to non-binary or non-digital systems. An example embodiment of the present invention would involve a blueprint that indicates physical measurements on an analog magnetic audio tape. The tape is physically severed as dictated by the measurements in the blueprint and the resulting sections stacked and ordered in separate containers. The blueprint can later be employed in revere to reconstruct and splice together the original audio tape.

Metadata for the information deconstructed by the present invention may be stored separately from the actual information and distributed if necessary to enable the previewing, indexing, searching or other management of deconstructed information without having to reconstruct the information.

An embodiment of the present invention may delay or otherwise schedule the transmission and storage of deconstructed electronic information subsets with the intention of making it difficult for an observer to determine which subsets are related or with the intention of optimizing processing, transmission or storage timing.

The present invention may be implemented in conjunction with traditional encryption methods. The irregular deconstruction performed by the present invention serves to further complicate compromising traditional encryption by adding additional processing steps and by complicating frequency analysis based attacks.

What is claimed is:

1. A method of Asymmetric Multi-Apparatus Electronic Information Storage operative to perform a deconstruction and storage of a collection of electronic information across a plurality of disparate storage apparatuses, comprising:
    determining an integer ranking of each of the plurality of disparate storage apparatuses;
    obtaining an electronic information blueprint;
    deconstructing the collection of electronic information into a plurality of subsets of electronic information, each of the subsets associated with at least one of the plurality of disparate storage apparatuses and comprising a number of portions of the overall collection determined by the integer ranking of the at least one of the plurality of disparate storage apparatuses, by copying, from a starting point within the collection, different sized portions of information, in different directions, wherein the sizes of the portions, their non-contiguous locations within the collection, and their direction of copying and hence order of information, are determined by the electronic information blueprint, whereby each of the subsets is individually unintelligible; and
    storing each of the subsets at the associated at least one of the plurality of disparate storage apparatuses.

2. The method of claim 1 wherein determining the ranking of each of the plurality of disparate storage apparatuses comprises determining the integer ranking based on mathematical aggregation of a configurable list of one or more of: available storage space, cost, location, reliability, and access speed.

3. The method of claim 1 further comprising emulating a virtual storage device such that the steps of deconstructing the collection of electronic information and storing the plurality of subsets appear to comprise a single step of storing the collection to the virtual storage device.

4. The method of claim 1 wherein one or more of the plurality of subsets of the electronic information are stored in the plurality of disparate storage apparatuses thereby providing simple redundancy for the plurality of subsets of the deconstructed electronic information.

5. The method of claim 1 further comprising encrypting one or more of the plurality of subsets of the electronic information prior to storing each of the subsets at the associated at least one of the plurality of disparate storage apparatuses.

6. The method of claim 1 wherein the electronic information blueprint comprises a random or pseudo-random sequence of bits.

7. The method of claim 1 wherein deconstructing the collection of electronic information, based on the electronic information blueprint, into the plurality of subsets of electronic information, comprises:
    concatenating the collection of electronic information, and metadata describing it, into a subject file;
    determining a starting point in the subject file;
    generating a before pointer and an after pointer, and initializing each to the starting point;
    at each copying iteration, successively, for each subset,
    for a number of times equal to the ranking of the associated storage apparatus, retrieving a successive segment of the electronic information blueprint; determining, from the retrieved segment, a data portion size and indication whether the data portion is before or after the starting point;
    copying a portion of data, of the determined size, from the subject file to the subset, from a position of the respective before or after pointer, in a direction away from the starting point; and decrementing or incrementing the relevant pointer to a position further from the starting point by the copied data portion size; and repeating the copying iterations until the entire collection of electronic information has been copied into subsets.

8. The method of claim 7 wherein determining a starting point in the subject file comprises:
    performing a logical operation between at least part of the metadata and a portion of the electronic information blueprint, and indexing the subject file using the result of the logical operation;
    wherein the metadata is a binary representation of the size of the subject file; and
    wherein the portion of the electronic information blueprint is a portion the same size as the metadata.

9. The method of claim 7 wherein the segment of the electronic information blueprint is an integral number of bytes.

10. The method of claim 7 wherein the determined data portion size is the binary value of the retrieved segment of the electronic information blueprint.

11. The method of claim 7 wherein the indication whether the data portion is before or after the starting point is whether the retrieved segment of the electronic information blueprint has even or odd parity.

12. A method of Asymmetric Multi-Apparatus Electronic Information Retrieval operative to perform a retrieval and construction of a collection of electronic information from a plurality of disparate storage apparatuses, wherein each of the plurality of storage apparatuses stores a subset of the collection of electronic information, deconstructed from the collection according to an electronic information blueprint, and with size of each subset related to a ranking of each associated storage apparatus, comprising:
    obtaining the electronic information blueprint, rankings of the plurality of storage apparatuses, and the order of processing subsets in the deconstruction;
    retrieving, from each of the plurality of storage apparatuses, an individually unintelligible subset of said collection of electronic information stored thereon;
    reconstructing the collection of electronic information from said retrieved subsets by copying from each subset a number of portions of data determined by the ranking of the associated storage apparatus; and writing the portions of data to non-contiguous locations in the collection of electronic information, beginning at a starting point with the collection, wherein the starting point, the location of each portion within the collection, and the order of the information in each portion, are determined by the electronic information blueprint.

13. The method of claim 12 wherein the electronic information blueprint contains the sequence, location, and interleaving pattern used to reconstruct the subsets of electronic information into the collection of electronic information.

14. The method of claim 12 further comprising emulating a virtual storage device such that the steps of retrieving the plurality of subsets and reconstructing the collection of electronic information appear to comprise a single step of retrieving the collection from the virtual storage device.

15. The method of claim 12 further comprising decrypting one or more subsets after retrieving the subset from an associated storage apparatus.

16. The method of claim 12 wherein reconstructing the collection of electronic information from the retrieved subsets, comprises:
   determining a starting point in the collection;
   generating a before pointer and an after pointer, and initializing each to the starting point;
   at each copying iteration, successively, for each subset, for a number of times equal to the ranking of the associated storage apparatus, retrieving a successive segment of the electronic information blueprint;
   determining, from the retrieved segment, a data portion size and indication whether the data portion is before or after the starting point;
   copying a portion of data, of the determined size, from the subset to the collection, at a position of the respective before or after pointer, in a direction away from the starting point; and decrementing or incrementing the relevant pointer to a position further from the starting point by the copied data portion size; and repeating the copying iterations until all data from all subsets has been copied and the entire collection of electronic information is reconstructed.

17. The method of claim 16 wherein determining a starting point in the collection comprises:
   performing a logical operation between at least part of the metadata describing the collection and a portion of the electronic information blueprint, and indexing the subject file using the result of the logical operation;
   wherein the metadata is a binary representation of the size of the collection; and
   wherein the portion of the electronic information blueprint is a portion the same size as the metadata.

18. The method of claim 16 wherein the segment of the electronic information blueprint is an integral number of bytes.

19. The method of claim 16 wherein the determined data portion size is the binary value of the retrieved segment of the electronic information blueprint.

20. The method of claim 16 wherein the indication whether the data portion is before or after the starting point is whether the retrieved segment of the electronic information blueprint has even or odd parity.

* * * * *